United States Patent [19]
Dolfing et al.

[11] 3,736,758
[45] June 5, 1973

[54] PROCESS FOR TREATING NON-AGRICULTURAL GROUNDS

[75] Inventors: Thale Dolfing, Winschoten; Jan Lolkema, Hoogezand, both of Netherlands

[73] Assignee: Scholten-Honig Research N.V., Foxhol, Netherlands

[22] Filed: Mar. 3, 1972

[21] Appl. No.: 231,727

[30] Foreign Application Priority Data

Mar. 5, 1971 Netherlands ...................... 7102972

[52] U.S. Cl. ................................................ 61/36 R
[51] Int. Cl. ............................................... E02d 3/12
[58] Field of Search ........................... 61/36 R, 36 X; 260/DIG. 14

[56] References Cited

UNITED STATES PATENTS

| | | | |
|---|---|---|---|
| 3,367,892 | 2/1968 | Jorczak et al | 61/36 R |
| 3,643,444 | 2/1972 | Hodgson | 61/36 R |
| 3,482,634 | 12/1969 | Cox | 61/36 R |
| 3,416,604 | 12/1968 | Rensvold | 61/36 R |
| 3,371,712 | 3/1968 | Adams | 61/36 R |
| 3,131,074 | 4/1964 | Thompson | 61/36 R |
| 3,077,054 | 2/1963 | Niemeijer | 61/36 R |
| 2,651,619 | 9/1953 | de Mello | 61/36 R |

FOREIGN PATENTS OR APPLICATIONS

| | | | |
|---|---|---|---|
| 885,762 | 12/1961 | Great Britain | 61/36 R |
| 1,053,870 | 1/1967 | Great Britain | 61/36 R |

*Primary Examiner*—David J. Williamowsky
*Assistant Examiner*—Alexander Grosz
*Attorney*—Wenderoth, Lind & Ponack

[57] ABSTRACT

Non-agricultural grounds, in particular storage sites for chemical products, are rendered impermeable to liquids by incorporating and homogeneously distributing a binder in the soil down to a depth of at least about 2.5 cm, said binder being selected from the group consisting of organic and inorganic, natural and synthetic binders, and being used in a proportion ranging from about 0.75 to about 15% by weight, calculated on the soil treated and after having moistened the soil, compacting the soil thus treated in still moist condition to form a homogeneous, compact mass, and coating the surface of the thus compacted upper layer of the soil with a thin layer, to be formed in situ, of a water-insoluble polymer selected from the group consisting of polyurethanes, polyesters, polyepoxy resins and polyvinyl compounds.

13 Claims, No Drawings

PROCESS FOR TREATING NON-AGRICULTURAL GROUNDS

This invention relates to a process for treating non-agricultural grounds, in particular to a process for treating storage sites for chemical products, such as crude petroleums and liquid toxic and/or hazardous compounds.

It is known that the increasing pollution of ground and surface waters substances harmful to vegetable and animal organisms and not decomposable by biological means, or insufficiently so, is one of the major problems of environmental hygiene. One of the most serious threats in the way ground and surface water pollution is petroleum, not only because this product is poorly decomposable by biological means, but especially because a minor quantity of oil can render huge quantities of ground water and surface water utterly unfit for use as drinking water while oil-contaminated water is also unsuitable for various industrial applications, for example, as cooling water for electrical power stations.

Crude petroleums and petroleum products are stored in large quantities in tanks in the vicinity of ports and harbors, refineries, electrical power plants, and petrochemical industries, and in order to prevent the penetration of oil into the soil in the case of leakage, breakage and other accidents, the storage sites of these oil terminals, which are mostly surrounded by embankments or walls, have generally been covered with materials such as concrete, asphalt, bitumen, or foils of plastics materials usually covered with concrete tiles, but none of these materials has in practice been satisfactory.

It has now been found that spilled oil can be fully prevented from penetrating into the ground, by intimately admixing the soil of storage sites for oil and other liquid chemicals down to a depth of at least 2.5 cm, but preferably 5 to 15 cm, with a binder in a proportion of more than 0.75 percent by weight, calculated on the soil to be treated, compacting the mixture of soil and binder in the presence of moisture to a homogeneous, coherent mass, and coating the surface of the compacted upper layer of the soil, preferably in dry condition, with a thin layer, to be formed in situ, of a water-insoluble polyurethane, polyester, polyepoxy, or polyvinyl polymer.

The method according to the invention accordingly consist in incorporating and homogeneously distributing in the soil, down to a depth of at least 2.5 cm, preferably down to a depth of 5 to 15 cm, an organic binder of natural or synthetic origin, in a proportion of more than 0.75 percent by weight, but no more than 15 percent, preferably no more than 5 percent, calculated on the soil to be treated, moistening the soil with water before, during or after the incorporation of the binder, compacting the soil thus treated in still moist condition to form a homogeneous, coherent mass, and coating the surface of the compacted upper layer of the soil, preferably in dry condition, with a thin layer, to be formed in situ, of a water-insoluble polyurethane, polyester, polyepoxy, or polyvinyl polymer.

The method according to the invention accordingly consist of two steps, namely, a first step in which the soil is mixed with a binder to a depth of at least 2.5 cm, and subsequently is compacted to a compact mass in moist condition, and a second step in which the upper layer of the soil thus compacted, after drying, is coated with a thin layer, to be formed in situ, of a water-insoluble polymer.

More particularly, the first step of the process according to the invention comprises the following operations: (a) loosening and crumbling the soil to a depth of at least 2.5cm, preferably to a depth of 5–15 cm, (b) homogeneously distributing a water-soluble or water-dispersible natural or synthetic binder through the loosened and crumbled soil layer, (c) thoroughly moistening the crumbled soil with water, either before, during or after the incorporation of the binder, and (d) compacting the soil layer treated while it is still in the moist condition to form a homogeneous, coherent and compact mass.

Loosening and crumbling soil to the required depth may be realized in various manners and by known agricultural techniques, such as roto-tilling, ploughing, harrowing, and raking. Crumbling the upper layer, that is, the layer having a depth of at least 2.5 cm, preferably 5–15 cm, is best effected in a period of dry weather. It will be clear that the binder is more properly and rapidly mixed with the layer to be treated according as the crumbs are finer and more uniform.

The loosened and crumbled layer of soil is thoroughly moistened with water either before, during or after the incorporation of the binder in the soil, depending on whether the binder is added in the form of an aqueous solution or dispersion, or in the form of a dry composition soluble or dispersible in cold water. In the latter case the soil is usually moistened after the dry binder has been worked into the soil, whereas in the former case the soil is preferably moistened before the aqueous solution or dispersion of the binder is applied.

The binder can be intimately mixed with the upper layer to be treated in accordance with the invention in various manners. Preferably, the crumbled upper layer is sprayed with the required quantity of an aqueous solution or dispersion of the binder, whereafter the layer thus treated is compacted in moist condition by vibration, rolling or ramming up to form a compact mass. In order to achieve proper impregnation of the upper layer to be treated with the binder, it is recommendable for the crumbled upper layer to be sprayed with a considerable amount of water before the aqueous solution or dispersion of the binder is sprayed on to it. Such pre-spraying with water is especially important if the binder is sprayed in the form of an aquous solution or dispersion of relatively high concentration, for example, of 20–30 percent.

Pre-spraying water on to the crumbled upper layer is less necessary, and can in many cases even be omitted, if the binder is applied and sprayed in the form of a dilute solution or dispersion, for example, in a concentration of 2–5 percent. If so desired, the soil can be crumbled and the aqueous binder solution or dispersion added in one combined treatment, for example, by means of a roto-tiller provided with a spraying device for aqueous liquids. If a very dilute aqueous binder solution or dispersion is used, steps (a) (b) and (c) of the process according to the invention may even be carried out in one treatment.

If the binders which may be used in accordance with the invention are readily soluble or dispersible in cold water in the dry state, they may, if so desired, be intimately mixed with the layer of soil to treated in the dry state. In this case the binder may be added before, during or after the crumbling of the upper layer.

In may cases it is advantageous to extend the binder prior to its addition to the soil with a solid, inert material or carrier, for example, earth, sand, marl, clay, chalk, talc and/or bentonite. Generally speaking, the use of solid extenders has the advantage that owing to the larger volume of binder to be sprinkled uniform distribution in the soil is facilitated, while in many cases the sprinklability of the binder is improved as well.

When the binder and the soil have been properly mixed, the crumbled upper layer is thoroughly sprayed with water, whereby the binder is rapidly dispersed or swells in the moisture present and will immediately become active and exercise its binding action on the soil. Thereafter the treated, still moist upper layer of the soil is compacted, for example, by rolling or ramming to form a homogeneous, coherent mass.

In order to improve the smoothness of the soil surface before the treated, still moist upper layer is compacted, it may often be desirable to spread out a thin layer of earth, for example, sand, on the surface, and subsequently to spray the thin layer with a small quantity of the aqueous binder solution or dispersion. If so desired, the soil layer treated with the binder may be reinforced by incorporating, prior to the compacting treatment, glass mats, polyester gauze, reinforced brick netting, asbestos network, or coarse-granular material, such as stone chippings, broken stone, rubble and gravel, into the moist layer.

The amount of binder to be applied depends on the depth of the upper layer and the nature of the soil to be treated, and generally ranges from more than 0.75 to 15 percent by weight, calculated on the soil treated. In most cases, however, excellent results are produced with a proportion of more than 0.75 to 5 percent. Binders of inorganic and organic origin are suitable for the process according to the invention, for example, silicates, cement, gypsum, clay, and high-polymeric organic compounds of natural or synthetic origin.

In a preferred embodiment of the process according to the invention, which is the most valuable one in practice, high-polymeric organic materials, soluble or dispersible in water are used as the binders, since the desired effect can be accomplished with these in considerably lower proportions than with binders of inorganic origin. The invention will therefore illustrated in more detail with reference to the former class of binders.

Examples of high-polymeric materials capable of producing aqueous dispersions, and suitable for the purposes of the present invention are homo- and co-polymers of vinyl compounds, such as vinyl esters of aliphatic acids, for example, vinyl acetate or vinyl propionate, acrylic acid or methacrylic acid, acrylic acid esters, for example 2-ethylhexyl acrylate, or methacrylic acid esters, acrylonitrile, vinyl chloride, ethylene, butadiene and styrene. In some cases it may be desirable to add a plasticizer to the insoluble polyvinyl compound to improve the binding properties of the insoluble polyvinyl compound to a degree which is the most suitable for the purposes of the invention. This class of high-polymeric materials produces excellent and long-lasting results, not only in the upper part of the range of percentages by weight referred to, but also in the lower part. Water-soluble high-polymeric materials of natural or synthetic origin may also be used as binders for the purposes of the invention, for example, water-soluble polyacrylates and polyacrylamides, and in particular water-soluble polysaccharides or water-soluble derivatives of polysaccharides.

Examples of such polysaccharides are starches, preferably cold-swelling starches, amylose and amylopectine, water-soluble ethers and ester of starches, of amylose and amylopectine, water-soluble ethers and esters of cellulose, vegetable gums, plant mucilages and microbial gums, such as *Xanthomonas* gum. Generally speaking, the water-soluble ethers and esters of these polysaccharides are preferred, because these derivatives not only have the advantage of being usually better soluble in water than the non-derived polysaccharides, but also because they are better resistant to biological decomposition by micro-organisms in the soil. The stability in the soil of water-soluble ethers and esters of these polysaccharides is satisfactory for many purposes, if they contain at least about 0.7 ether or ester groups per structural unit of the polysaccharide molecule. Preferably, however, products are used which on an average contain at least one ether and/or ester group per structural unit, it having been found that such ethers and esters are not, or practically not decomposed by soil micro-organism. Generally speaking, they are attacked to a lesser extent according as they contain a larger number of ether or ester groups per structural unit. By "structural units" are meant the simple monosaccharide molecules from which the polysaccharide is built up.

According to an important embodiment of the process according to the invention, water-soluble or water-dispersible starch ethers are used, with which very favorable results are obtained. Examples of suitable starch ethers are water-soluble hydroxyethyl and hydroxypropyl ethers, water-soluble carboxymethyl ethers, water-soluble or water-dispersible benzyl ethers, and mixed ethers, such as water-soluble hydroxyethyl carboxymethyl ethers and hydroxyethylbenzyl ethers of starch. Particularly suitable for the subject purpose are cold-soluble or cold-swelling starch ethers, produced by the process described in British Pat. No. 601,374. They are not only cheap, owing to their simple preparation, but they have the important advantage of consisting of porous, more or less spongy flakes, which by virtue of this structure readily and completely dissolve or swell in cold water. Very good results are also obtained with combinations of water-insoluble and water-soluble high-polymeric materials, in particular with mixtures of water-insoluble polyvinyl compounds and water-soluble starch ethers. In such mixtures the ratio by weight of the two components may vary within in a wide range. Such mixtures may be prepared by adding an aqueous solution of the starch ether to an aqueous dispersion of the insoluble polyvinyl compound. Also, dry compositions containing both the water-insoluble polyvinyl compound and the water-soluble starch ether may be stirred with cold or warm water to form a dilute dispersion. Such dry compositions may be produced by simple the admixture of powdered, water-dispersible polyvinyl compounds and dry, water-soluble starch ethers, but they may also be prepared by drying a mixture of a soluble starch ether and an aqueous dispersion of a polyvinylcompound, for example, on heated rollers. In the last-mentioned case, dry cold-water-dispersible compositions are produced, which can be incorporated in the soil to be treated in the dry state or in the form of an aqueous dispersion.

Other products which may be used for the process according to the invention are water-soluble or water-dispersible starch/vinyl graft copolymers, for example, starch/polyacrylonitrile, starch/poly(methylmethacrylate) and starch/poly)methylacrylate) graft copolymers, and furthermore emulsions of asphalt or bitumen. In case the high-polymeric binders to be used in the process according to the invention contain ionic carboxyl groups, a polyvalent metal salt, for example, aluminum sulphate, may be added, if so desired, either before or after the binder has been admixed with the soil, which metal salt produces an insoluble compound with the carboxyl groups containing polymer, which increases the water resistance of the binder, and reduces its tendency to migrate.

In the second step of the process according to the invention, the upper layer of the soil, bound and compacted in the first step, is coated with a thin, closed layer, to be formed in situ, of a water-insoluble polyurethane, polyester, polyepoxy, or polyvinyl polymer.

In a preferred embodiment of the invention, the surface of the compacted upper layer of the soil is coated in the dry state with a non-cellular polyurethane polymer. This can be effected by spraying the components for the formation of a non-cellular polyurethane polymer, namely, a mixture of an organic polyisocyanate and an polyfunctional polyol, in the desired ratio, on to the surface of the compacted upper layer of the soil, possibly after dilution with an organic solvent.

Suitable polyisocyanates according to the invention are all isocyanates conventional in present-day polyurethane technology. However, di- and triisocyanates are preferred. Thus suitable compounds are: aliphatic and aromatic, di- and polyvalent isocyanates, for example, the alkylene diisocyanates, such as tetra- and hexamethylene diisocyanates, arylene diisocyanates and corresponding alkylene products, such as m- and p-phenylene diisocyanate, naphthalene diisocyanate, diphenylmethane diisocyanate, toluylene diisocyanates, such as 2,4- and 2,6-toluylene diisocyanates and their mixtures, di- and triiso-propylbenzene diisocyanate and triphenylmethane triisocyanate, p-isocyanatophenylthiophosphoric acid triester, p-isocyanatophenyl phosphoric acid triester, aralkyl diisocyanates, such as 1-(isocyanato-phenyl)ethyl isocyanate or m- and p-xylylene diisocyanate, as well as polyisocyanates of the types enumerated above, but substituted with various groups, such as alkoxy, aryloxy, —NO$_2$ and —Cl, furthermore polyphenyl polymethylene polyisocyanates, produced by anailine-formaldehydecondensation followed by phosgenation, the conversion products of the above isocyanates with a shortage of polyhydroxy compounds, for example, trimethylolpropane, hexanetriol, glycerol and butanediol.

Polyols in the sense of the invention are preferably polyether polyols having a functionality relative to isocyanate groups of 2-9 and hydroxyl numbers of 30–600. Such polyether polyols may be produced by reacting polyhydric alcohols with alkylene oxides. As polyhydric alcohols may be used, for example, glycerol, trimethylolpropane, pentaerytritol, sorbitol, glucose and saccharose. As suitable alkylene oxides may be mentioned, by way of example, propylene oxide, 1,2-, 1,3- and 2,3- epoxybutane, styrene oxide and epichlorohydrine. Mixtures of these compounds with up to 30 percent by weight of ethylene oxide may also be used. The reaction may be catalyzed by bases. However, we preferably use polyether polyols produced by means of such a reaction with acid catalysis, for example, using boron trifluoride. Characteristic of such polyether polyols is that, in addition to secondary hydroxyl groups, they contain a considerable proportion of primary hydroxyl groups.

Other suitable polyols in the sense of the invention are polyethers on the basis of ethylenediamine and/or diethylenetriaminealkylene oxides or polyesters, for example, on the basis of adipic acid-ethyleneglycol, with terminal hydroxyl groups.

Finally, also suitable as polyhydroxyl compounds according to the invention are polyethers as can be produced, for example, by the polyaddition of epoxy compounds to water. Thus, polyethyleneglycol, polypropyleneglycol, poly(1,2-butyleneglycol) and polyepichlorohydrine may be mentioned as examples. Polybutyleneglycol can also be produced by the polymerization of tetrahydrofuran.

Excellent results are obtained using as the polyol component an acid-catalysed polyolether with a hydroxyl number of 150–350, as described, for example, in British Pat. specification No. 1,016,589.

In order to produce homogeneous, closed films or layers, it is desirable that the polyol to be used contains no water, and it is therefore recommendable to add a moisture binder, for example, triethylorthoformate or sodium aluminum silicate, to it beforehand. If so desired, the polyurethane polymer to be used for the coating may be combined with tar or bitumen to increase the resistance of the coating to certain chemical products, e.g. concentrated sodium hydroxide.

The reaction between the polyisocyanate and the active hydrogen atoms containing compound usually has to be accelerated by adding a catalyst which promotes the urethane forming reaction. Such an activating effect of tertiary amines has long since been known. In addition to the tertiary amines, organic metal compounds, such as, for example, stannous octoate and di-n-butyltindilaurate are being used as catalysts. Organic metal compounds which give excellent results for the purposes of the present invention are the alcoholates and phenolates of vanadium and zirconium, which are described in Dutch Patent Applications Nrs. 7006325 and 7006706, which are open to public inspection. The last-mentioned catalysts result in the production of perfectly homogeneous, smooth layers or films of the polyurethane polymer even at high ambient humidities which of course is of great importance for the desired impermeability of the coating.

According to a different embodiment according to the invention, the surface of the soil cemented together by means of a binder and compacted is coated with a thin layer, to be formed in situ, of a water-insoluble polyester or polyepoxy polymer. The water-insoluble polyester polymers may be produced in known manner by copolymerization of an unsaturated polyester prepolymer with a water-insoluble vinyl monomer. Unsaturated polyester prepolymers suitable for the purposes of the invention are produced from unsaturated dibasic acids, such as maleic acid and fumaric acid and, if so desired, other di-basic acids, by esterification with saturated polyhydric alcohols, such as glycols. The copolymerizable vinyl monomers, for example, styrene, acrylic acid esters, methacrylic acid esters or dially phthalate, can react with the unsaturated polyester prepolymers via the double bonds in the unsaturated dibasic acid radicals to produce a tri-dimensionally crosslinked structure.

The copolymerization can be promoted by adding a curing system consisting of a catalyst, for example, a peroxide, such as benzoyl peroxide, and an activator, for example, dimethylaniline, which can cause the unsaturated polyester prepolymer and the vinyl monomer to react at room temperature to form a thermosetting, non-melting polyester resin.

Polyepoxy polymers suitable for the purpose of the present invention can be produced by curing low-molecular epoxy resins, which are commonly prepared by dehydrochlorination of reaction products of epihalohydrines with aliphatic or aromatic polyhydroxy compounds, such as glycerol and diphenylolpropane. We preferably use epoxy resins with an average molecular weight of up to 500, the polyglycidyl ethers of diphenylolpropane being particularly preferred. Further suitable low-molecular epoxy resins are polyglycidyl ethers of diphenylolmethane, of long-chain bisphenols, of novolacresins, of glycerol and mixtures of these polyglycidyl ethers.

These epoxy resins may be converted in known manner by means of curing agens into water-insoluble polymeric products. Suitable curing agents are primary aliphatic polyamines (or secondary amine adducts thereof with mono- or bi-functional glycidyl compounds, ethylene oxide, propylene oxide, or acrylonitrile), primary aromatic diamines, tertiary amines (or salts thereof), piperidine, dicyanodiamide, organic di- and polybasic acids and acid anhydrides, polyacrylic acid or polyacrylic amide.

According to still another embodiment of the method according to the invention, the compacted upper layer of the soil is coated with a thin layer, to be formed in situ, of a water-insoluble polyvinyl compound. The selection of a suitable polyvinyl compound is correlated to the nature of the chemical to which the soil is to be rendered impermeable.

Suitable polyvinyl compounds for oil-proofing the soil are, for example, water-insoluble homo- and copolymers of vinyl esters of lower aliphatic fatty acids, and esters of lower alcohols and acrylic or methacrylic acid.

In this embodiment we preferably use aqueous dispersions of polyvinyl compounds suitable for the purposes of the invention, but if desired, solutions of polyvinyl polymers in organic solvents may be used, which, however, for reasons of economy, is generally less attractive.

The thickness of the coating consisting of the water-insoluble polymeric compound may vary from some tenths of millimeters, e.g. 0.3 mm, to some centimeters, for example 2 cm, but for most purposes a thickness of 0.5 to 5 mm is preferred.

If desired, the coating consisting of polyurethane, polyester, polyepoxy, or polyvinyl polymer may contain fillers and/or reinforcing agents, for example, sand, aluminum oxide, glass fibers, asbestos fibers or polyester mats.

The process according to the invention can be applied to various types of soils, such as clays, sands and soils consisting of mixtures of clay and sand. The main object of the process according to the invention is the treatment of petroleum storage sites to prevent that in the case of leakage or some calamity or other, oil penetrates into the soil and consequently ground water and surface water is gravely poluted. In addition to the treatment of storage sites for petroleums and petroleum products, the process according to the invention is applicable to the treatment of storage sites for other chemical products, in particular those which are toxic to vegetable and animal organisms and are not biologically decomposed, or poorly so.

Other uses for which the process according to the invention is of interest concern the construction of dikes, roads, railway tracks, water basins, terrains for military purposes, swimming pools, and landing strips or fields for airplanes and helicopters.

The invention is illustrated in and by the following examples.

Example I

The upper layer of an embankment consisting of clayey sand around a large oiltank and of the horizontal portion of the enclosed tank compound is raked to a depth of 4 to 6 cm, preferably during dry weather Raking and harrowing is continued until the layer of 4 to 6 cm has a uniform, crumbly structure.

The crumbled upper layer of the embankment of the compound is sprayed with a 20 percent dispersion of a copolymer of 80 parts by weight of vinyl acetate and 20 parts by weight of 2-ethylhexylacrylate in a proportion of 10 liters of liquid per $m^2$, corresponding with about 2,3 percent by weight, calculated on the soil treated.

The moist upper layer of the embankment and of the compound is subsequently compacted in moist condition by means of a vibrator to form a compact, homogeneous mass.

After drying of the thus compacted upper layer of the embankment and of the compound, the layer is sprayed with a polyurethane forming composition, consisting of a mixture of crude methylenediphenyldiisocyanate as the isocyanate component, hydroxypropylated dextrose containing secondary and primary hydroxyl groups and having a hydroxyl number of 250, as the polyol component, and vanadium oxyisopropylate as the catalyst for the urethane forming reaction. The polyurethane polymer is reinforced by blowing glass fibers on to the substrate as the polyurethane forming mixture is being sprayed on to it, the fibers being produced by cutting up an endless glass roving to an average fiber length of 3 cm by means of a cutter. In this way the upper layer of the embankment and of the compound is covered with a glass fiber reinforced polyurethane layer of about 1 mm.

The embankment and compound thus compacted and after-treated are excellently resistant to the penetration of oil, while the upper layer has an excellent stability under greatly varying weather conditions.

Example II

The walls and bottom of a large water basin, both consisting of clayey sand, are mechanically raked to a depth of 8 to 12 cm, preferably in dry weather. Raking and harrowing is continued till the layer of 8–12 cm has a uniform crumbly structure.

The crumbled layer is sprayed with a 15 percent dispersion of a mixture of high polymeric vinyl compounds in a quantity of 15 liter per $m^2$, corresponding with about 1.3 percent by weight of binder, calculated on the soil treated. The mixture of the polyvinyl compounds consists as to half of a copolymer of 80 parts by weight of vinyl acetate and 20 parts by weight of 2- ethylhexyl acrylate, and as to the other half of the ammonium salt of a copolymer of 80 parts by weight of vinyl acetate, 15 parts by weight of 2-ethylhexyl acrylate and 5 parts by weight of acrylic acid. After the spraying the still moist layer is compacted to form a compact, homogeneous mass.

After drying the bound and compacted layer of soil is coated with a thin layer, 2 mm thick, of glass-reinforced polyester. For this purpose an unsaturated polyester resin having a good water resistance, such as a resin prepared from ethyleneglycol and glycerol, maleic acid anhydride and isophthalic acid, after dilution with styrene in a proportion of 40 percent by weight, calculated on the resin and with the addition of methyl-ethyl ketone hydroperoxide and cobalt octoate for the catalysis of the polymerization reaction, is sprayed on to the compacted soil layer. During the spraying of the resin glass fibers are blown on to the substrate.

Example III

The upper layer of an embankment and the horizontal portion of a gasoline tank compound, consisting of sand, is raked to a depth of 8 to 12 cm, and raking and harrowing in continued until the layer of 8 to 12 cm has a homogeneous, crumbled structure.

The thus pre-treated upper layer of the embankment and the compound is sprayed with a 15 percent dispersion of a copolymer of 80 parts by weight of methyl methacrylate and 20 parts by weight of 2-ethylhexyl acrylate in a quantity of 10 liter liquid per m$^2$, corresponding with about 0.9 percent by weight, calculated on the soil treated. The upper layer of the embankment and the compound are subsequently compacted to form a compact, homogeneous mass. After drying the compacted upper layer of the embankment and the compound is sprayed with a polyurethane forming composition, consisting of a mixture of crude methylene diphenyl diisocyanate as the isocyanate component, hydroxypropylated dextrose containing secondary and primary hydroxyl groups and having a hydroxyl number of 300, as the polyol component, and n-propylzirconate as the catalyst for the urethane forming reaction. The proportion of composition is selected so that the thickness of the coating, consisting of non-cellular polyurethane polymer, is about 1.5 mm. The coating formed, which adheres excellently to the substrate, consists of a homogeneous, closed film which contains no or substantially no gas bubbles.

The embankment and compound thus compacted and after-treated are excellently resistand to the penetration of gasoline, while the stability of the upper layer is excellent under wildly varying weather conditions.

Example IV

The upper layer of a storage site for agricultural chemicals, consisting of sand, is mechanically raked to a depth of about 12 cm, and immediately thereafter the crumbled layer is admixed with a 15 percent aqueous dispersion of a homopolymer of vinyl propionnate, the water phase of which contains per liter 50 g of a cold-water-soluble hydroxypropylether of starch having an average degree of substitution of 1.2 hydroxypropyl groups per glucose unit. The mixture of high polymeric binders is applied in a proportion of 2.6 percent by weight, calculated on the sand treated.

After the admixture of sand and binder the still moist layer of sand is compacted by means of a vibrator to form a compact homogeneous mass. After drying the thus densified upper layer of the sand is sprayed with a 40 percent solution of a polymethacrylic acid ester in xylene in a proportion such that after evaporation of the solvent a thin, closed film, 1–2 mm thick, has formed on the surface of the sand.

If so desired, the resulting film can be reinforced in known manner with glass in the form of fibers matting or fabric. The solution of polymethacrylicacid ester used an acid number of about 7, calculated on the dry resin, while the viscosity and the specific gravity of the resin solution at 20°C are 15 poises and 0.94, respectively.

Example V

The upper layer of a clayey sand storage site for solid and liquid chemical products is treated as described in Example IV, but now with a 15 percent aqueous dispersion of polyvinyl propionate in a proportion of 2 percent by weight of binder, calculated on the soil treated. After compacting and drying the surface of the upper layer is coated with a thin closed layer, about 4 mm thick, of a water-insoluble and sand-filled polyepoxy polymer. For this purpose the upper layer of the sand is coated with a coating composition consisting of a mixture of a solvent-free polyepoxide resin, sold under the trade name of Araldit PY 880, a solvent-free polyamine as curing agent for the epoxy resin, and fine sand in a proportion of 60 to 70 percent by weight, calcultated on the overall coating composition.

Example VI

The upper layer of the embankment and compound of a crude petroleum tank, both consisting of sand, is successively mixed, to a depth of 6–8 cm, with 5 percent by weight of bentonite clay and 1 percent weight of a water-insoluble polyvinyl polymer, both calcultated on the weight of the sand being treated. The polyvinyl polymer, which consists of a mixture of equal parts by weight of polyvinyl acetate and polyvinyl propionate, is added to the resulting mixture of sand and bentonite clay in the form of a 20 percent aqueous dispersion.

After the incorporation of the two binders in the upper layer of the sand body constituting the embankment and the compound, the upper layer is compacted in still moist condition by means of a vibrator to form a homogeneous compact mass.

After drying the upper layer thus compacted is coated with a thin, closed film, 1 to 2 mm thick, of a polyurethane polymer formed in situ. For this purpose the surface of the dry, compacted upper layer is sprayed with a polyurethane polymer forming composition, consisting of a mixture of crude methylenediisocyanate as the isocyanate component, hydroxypropylated dextrose containing secondary and primary hydroxyl groups, and having a hydroxyl number of 330, as the polyol component, and vanadylcyclohexanolate as the catalyst for the urethane forming reaction. The compacted layer of soil is sprayed with this composition until the coating being formed in situ has a thickness of 2 mm. The coating adheres excellently to the surface of the compacted layer of soil and consists of a homogeneous, closed film, substantially free of gas bubbles.

The embankment and compound thus compacted and after-treated are excellently resistant to the penetration of oil, while the durability of the coating under greatly varying weather conditions is excellent. If so desired the coating applied may be reinforced by means of glass fibers in the manner indicated in Example I.

We claim:

1. A process for treating non-agricultural grounds, in particular storage sites for chemical products, which comprises incorporating and homogeneously distributing in the soil down to a depth of at least about 2.5 cm. a substance capable of binding soil particles together, selected from the group consisting of silicates, cement, gypsum, clay, high-polymeric natural organic compounds and high-polymeric synthetic organic compounds in a proportion ranging from about 0.75 to about 15 percent by weight calculated on the treated soil layer and moistening the soil, thereupon compacting the treated soil while still being moist to form a homogeneous, compact mass and coating the surface of the thus compacted upper layer of the soil with a thin layer, to be formed in situ, of a water-insoluble polymer selected from the group consisting of non-cellular polyurethanes, polyesters and polyepoxy resins.

2. A process according to claim 1, wherein the binder is incorporated in the soil to a depth ranging from about 5 to about 15 cm.

3. A process according to claim 1, wherein the binder is used in a proportion of about 0.75 to about 5% by weight, calculated on the soil treated.

4. A process according to claim 1, wherein the binder is selected from the group consisting of water-soluble and water-dispersible, natural and synthetic, high-polymeric materials.

5. A process according to claim 1, wherein the binder is used in the form of a dilute aqueous mixture.

6. A process according to claim 1, wherein the soil is moistened with water before the binder is applied.

7. A process according to claim 1, wherein the soil is moistened with water as the binder is applied.

8. A process according to claim 1, wherein the soil is moistened with water after the binder has been applied.

9. A process according to claim 1, wherein the water-insoluble polymer is a non-cellular polyurethane, and the polyurethane forming mixture is applied to the surface of the soil when said surface is in substantially dry condition.

10. A process according to claim 1, wherein the layer of water-insoluble polymer is applied in a thickness ranging from some tenths of a millimeter to some centimeters.

11. A process according to claim 1, wherein the layer of water-insoluble polymer is applied in a thickness ranging from about 0.5 to about 5 mm thick.

12. A process according to claim 1, wherein said non-agricultural ground is a storage site for chemicals, an embankment, a roadside, a slope, a bank, a quay, a temporary road, or a building site.

13. A process according to claim 1, wherein said non-agricultural ground is the compound and the protective embankment of a storage depot for inflammable liquids, such as that of a large oil tank.

* * * * *